(12) United States Patent
Nashida et al.

(10) Patent No.: US 11,642,660 B2
(45) Date of Patent: May 9, 2023

(54) PURIFICATION CATALYST FOR INTERIOR OF POLYMER FILM PRODUCTION FURNACE AND PURIFICATION METHOD FOR INTERIOR OF POLYMER FILM PRODUCTION FURNACE

(71) Applicant: NIKKI-UNIVERSAL CO., LTD., Tokyo (JP)

(72) Inventors: Toshiya Nashida, Kanagawa (JP); Naoki Tone, Kanagawa (JP)

(73) Assignee: NIKKI-UNIVERSAL CO., LTD., Tokyo (JP)

( * ) Notice: Subject to any disclaimer, the term of this patent is extended or adjusted under 35 U.S.C. 154(b) by 227 days.

(21) Appl. No.: 16/938,539

(22) Filed: Jul. 24, 2020

(65) Prior Publication Data
US 2020/0353451 A1 Nov. 12, 2020

Related U.S. Application Data

(62) Division of application No. 15/769,283, filed as application No. PCT/JP2016/082371 on Nov. 1, 2016, now abandoned.

(51) Int. Cl.
| | | |
|---|---|---|
| B01J 35/00 | (2006.01) | |
| B01J 23/889 | (2006.01) | |
| B29C 55/02 | (2006.01) | |
| C08J 5/18 | (2006.01) | |
| B01D 53/86 | (2006.01) | |
| B01J 23/00 | (2006.01) | |
| B01J 35/10 | (2006.01) | |

(52) U.S. Cl.
CPC ........ B01J 23/889 (2013.01); B01D 53/8668 (2013.01); B01J 23/002 (2013.01); B01J 23/8892 (2013.01); B01J 35/0006 (2013.01); B01J 35/1014 (2013.01); B01J 35/1019 (2013.01); B29C 55/02 (2013.01); C08J 5/18 (2013.01); B01D 2255/2022 (2013.01); B01D 2255/2073 (2013.01); B01D 2255/20761 (2013.01); B01D 2255/65 (2013.01); B01D 2255/9207 (2013.01); B01D 2257/708 (2013.01); B01D 2258/0283 (2013.01); B01J 2523/13 (2013.01); B01J 2523/17 (2013.01); B01J 2523/72 (2013.01); Y02A 50/20 (2018.01)

(58) Field of Classification Search
None
See application file for complete search history.

(56) References Cited

U.S. PATENT DOCUMENTS

| | | | | |
|---|---|---|---|---|
| 6,353,087 B1 * | 3/2002 | Chang-Mateu | ......... | C08F 6/003 528/481 |
| 6,517,899 B1 * | 2/2003 | Hoke | .................... | B01D 53/885 502/514 |
| 9,694,344 B2 * | 7/2017 | Song | ....................... | B01J 20/305 |
| 2002/0018742 A1 ‡ | 2/2002 | Hoke | ..................... | B01D 53/02 423/219 |
| 2006/0034777 A1 * | 2/2006 | Mahling | ................... | C08F 6/26 424/46 |
| 2012/0245236 A1 ‡ | 9/2012 | Suib | ..................... | B01J 23/8892 518/71 |
| 2015/0336090 A1 ‡ | 11/2015 | Kanna | ..................... | B01J 29/74 549/485 |

FOREIGN PATENT DOCUMENTS

| | | | |
|---|---|---|---|
| CN | 102247846 | * | 11/2011 |
| JP | 59-98821 A | ‡ | 6/1984 |
| JP | 60-45577 B2 | ‡ | 10/1985 |
| JP | 6-106125 A | | 4/1994 |
| JP | 10-512805 A | ‡ | 12/1998 |
| JP | 11-77823 A | ‡ | 3/1999 |
| JP | 11-276862 A | ‡ | 10/1999 |
| JP | 11-342535 A | ‡ | 12/1999 |
| JP | 2002-144420 A | ‡ | 5/2002 |
| JP | 2012-196653 A | ‡ | 10/2012 |

(Continued)

OTHER PUBLICATIONS

Luo, Jian et al. "Total Oxidation of VOCs with hydrophobic cryptomelane . . . ". Microporous and Mesoporous Materials. 35-36. 209-2217 (2000). (Year: 2000).*
Sun, Ming et al. "Rapid Synthesis of Cryptomelane . . . ". Materials Letters 65. 3184-3186 (2011). (Year: 2011).*
Rusu, Alice et al. "Destruction of VOCS by catalytic oxidation". En. Engineering and Management Journal. vol. 2. No. 4. 273-302. (2003). (Year: 2003).*
Liu et al., "Highly active CuO/OMS-2 catalysts for low-temperature CO oxidation", Chemical Engineering Journal, Aug. 1, 2010, vol. 162, No. 1, pp. 151-157, ISSN 1385-8947.‡
Written Opinion of the International Searching Authority, issued in PCT/JP2016/082371, dated Jan. 24, 2017.‡

(Continued)

*Primary Examiner* — Sheng H Davis
(74) *Attorney, Agent, or Firm* — Birch, Stewart, Kolasch & Birch, LLP

(57) ABSTRACT

A method for purifying a gas inside a polymer film production furnace with the use of the purification catalyst is provided. A purification catalyst for a gas inside a polymer film production furnace, contains a mixed oxide composed of a manganese-based oxide containing manganese and potassium and having a cryptomelane structure, and copper oxide. A method for purifying a gas inside a polymer film production furnace, includes a step 1 of bringing hot air containing volatile and/or sublimable organic substances, generated during production of a polymer film by the polymer film production furnace, into contact with the catalyst provided inside or outside the furnace, at a temperature in the range of 200 to 350° C. to decompose the organic substances oxidatively, and a step 2 of refluxing all or a part of a resultant decomposition gas to the polymer film production furnace.

7 Claims, 6 Drawing Sheets

(56) References Cited

FOREIGN PATENT DOCUMENTS

| | | | | |
|---|---|---|---|---|
| JP | 2014-516765 | A | ‡ | 7/2014 |
| TW | 200934574 | A | ‡ | 8/2009 |
| TW | 201728367 | | * | 8/2017 |
| WO | WO 96/22148 | A2 | ‡ | 7/1996 |
| WO | WO 2009/125829 | A1 | ‡ | 10/2009 |
| WO | WO 2014/141199 | A1 | ‡ | 9/2014 |
| WO | WO 2015/066272 | A2 | | 5/2015 |

OTHER PUBLICATIONS

Luo et al., "Total oxidation of volatile organic compounds with hydrophobic cryptomelane-type octahedral molecular sieves", Microporous and Mesoporous Materials, Apr. 2000, vol. 35-36, pp. 209-217, ISSN 1387-1811.‡

Hernandez et al., "Cu-modified cryptomelane oxide as active catalyst for CO oxidation reactions", Applied Catalysis B: Environmental, Jul. 23, 2012, vol. 123-124, pp. 27-35, ISSN 0926-3373.‡

Taiwanese Office Action and Search Report dated Jun. 8, 2020 for Application No. 105135881 with an English translation of the Office Action.

Chinese Office Action for Application No. 201680063071.3, dated Apr. 27, 2020, with English translation.

Extended European Search Report dated Apr. 16. 2019, in European Patent Application No. 16862050.8.

Genuino et al. "Gas-Phase Total Oxidation of Benzene, Toluene, Ethylbenzene, and Xylenes Using Shape-Selective Manganese Oxide and Copper Manganese Oxide Catalysts", The Journal of Physical Chemistry, vol. 116, May 17, 2012, pp. 12066-12078.

Hernández et al., "Cu-modified cryptomelane oxide as active catalyst for CO oxidation reactions", Applied Cataiysis B: Environmental, Jul. 23, 2012, vol. 123-124, pp. 27-35, ISSN 0926-3373.

International Search Report, issued in PCT/JP2016/082371, dated Jan. 24, 2017.

\* cited by examiner
‡ imported from a related application

PURIFICATION CATALYST FOR INTERIOR OF POLYMER FILM PRODUCTION FURNACE AND PURIFICATION METHOD FOR INTERIOR OF POLYMER FILM PRODUCTION FURNACE

CROSS-REFERENCE TO RELATED APPLICATIONS

This application is a Divisional of application Ser. No. 15/769,283 filed on Apr. 18, 2018, which is a National Phase of PCT International Application No. PCT/JP2016/082371 filed on Nov. 1, 2016, which claims priority under 35 U.S.C. § 119(a) to Patent Application No. 2015-217273 filed in Japan on Nov. 5, 2015. All of the above applications are hereby expressly incorporated by reference into the present application.

TECHNICAL FIELD

This invention relates to a catalyst for removing volatile organic compounds (VOCs) or sublimable organic substances generated in a polymer film production furnace; and a method for purifying a gas inside a polymer film production furnace with the use of the catalyst.

BACKGROUND ART

Inside a polymer film production furnace, organic fine particles of volatile organic compounds (VOCs), sublimable organic compounds, etc., derived from a starting polymer, are present in a mixed form. If these organic fine particles deposit on the resulting film during a production process, they may deteriorate the quality of the film.

PRIOR ART

Patent Literature 1 discloses the technology of passing hot air within a tenter furnace in PET film production through an oxidation catalyst layer composed of a platinum group metal (ruthenium, rhodium, palladium, osmium, iridium, or platinum).

Patent Literature 2 discloses a technology which, during production of a PET film with hot air being circulated within a tenter furnace, comprises burning and removing an oligomer generated within the tenter furnace with the use of an oxidation catalyst, and blowing the hot air after removal of the oligomer against the surface of the film.

Patent Literature 3 discloses a technology in a process for production of a biaxially oriented polyester film, the technology comprising arranging a platinum catalyst in a hot air circulation path, thereby subjecting low molecular weight substances, which have volatilized from the film and mixed into circulated hot air, to efficient combustion treatment with the platinum catalyst.

Patent Literature 4 discloses a technology using a filter incorporating a platinum catalyst block for removal of an oligomer.

Patent Literature 5 discloses the technology of providing a tenter with a catalyst for decomposition and removal of a sublimate which has resulted from a thermoplastic resin.

As described above, the literatures cited above present the facts that an oxidation catalyst is used to treat a gas inside a drafting oven in a PET stretching device; that a platinum group metal (ruthenium, rhodium, palladium, osmium, iridium, or platinum) is used as an active ingredient of the oxidation catalyst; and that the treated gas is circulated and used again.

Patent Literature 6 discloses a purification catalyst for a gas inside a PET drafting oven, the purification catalyst containing at least one inorganic oxide, namely alumina or zirconium oxide, and platinum. The literature also discloses that the purification catalyst may contain zeolite.

Patent Literature 6 describes that the following effects can be obtained by possessing the above-mentioned features: (1) A sublimable polymer contained in the gas inside the PET drafting oven, such as a PET oligomer, is oxidatively decomposed at a high conversion rate to be converted into $CO_2$ and $H_2O$. The purification catalyst has activity minimally decreased, and is excellent in durability. (2) Aldehydes generated during PET film stretching are oxidatively decomposed at the same time. (3) Long-term purification of the gas inside the PET drafting oven, which has been difficult to achieve using so far known catalysts, can be achieved. Thus, staining of the drafting oven can be prevented, and a burden on the maintenance and administration of the drafting oven can be lessened.

Problems with Prior Art

The aforementioned Patent Literatures 1 to 5 do not report the details of the catalysts.

Silicon-containing compounds or organic sulfur compounds derived from additives incorporated in a polymer film may be included within a polymer film production furnace. Since they cause a decline in catalytic activity, the durability of the catalyst is also important. Moreover, aldehydes such as acetaldehyde are generated, so that a catalyst simultaneously decomposing and removing them is desired.

Patent Literature 6 shows that its purification catalyst exhibits excellent performance in removing the PET oligomer generated inside the PET furnace. However, this literature is silent on the removal of volatile organic compounds generated inside production furnaces for other polymer films.

CITATION LIST

Patent Literatures

PTL 1: JP-A-Sho-59-98821
PTL 2: JP-B-Sho-60-45577
PTL 3: JP-A-Hei-11-342535
PTL 4: JP-A-Hei-11-77823
PTL 5: JP-A-2002-144420
PTL 6: WO2009/125829

SUMMARY OF INVENTION

Technical Problem

It is an object of the present invention, therefore, to provide a catalyst for decomposing organic fine particles of volatile organic compounds (VOCs) or sublimable organic substances, generated inside a polymer film production furnace, at a high conversion rate; provide a high durable catalyst; and provide a method for purifying a gas inside a polymer film production furnace with the use of the catalyst.

Solution to Problem

The present inventors developed a novel catalyst for decomposing volatile organic compounds (VOCs) or sublimable organic substances, generated inside a polymer film production furnace, at a high conversion rate. They have found that this catalyst is excellent in durability, and have accomplished the present invention. The gist of the present invention is as follows:

[1] A purification catalyst for a gas inside a polymer film production furnace, the purification catalyst containing a mixed oxide composed of a manganese-based oxide, which contains manganese and potassium and has a cryptomelane structure, and copper oxide.

[2] The purification catalyst according to [1], wherein the content of the copper oxide is 10 to 30% by weight as CuO based on the mixed oxide.

[3] The purification catalyst according to [1] or [2], wherein the content of the manganese is 65 to 85% by weight as $MnO_2$ based on the mixed oxide.

[4] The purification catalyst according to any one of [1] to [3], wherein the content of the potassium is 0.1 to 10% by weight based on the mixed oxide.

[5] The purification catalyst according to anyone of [1] to [4], wherein the specific surface area (BET specific surface area) of the mixed oxide is 200 $m^2/g$ or more.

[6] The purification catalyst according to anyone of [1] to [5], wherein the specific surface area (BET specific surface area) of the mixed oxide after being heated for 1 hour at 500° C. is 85 $m^2/g$ or more.

[7] The purification catalyst according to anyone of [1] to [6], wherein the gas inside the polymer film production furnace contains volatile and/or sublimable organic substances generated during production of a polymer film.

[8] The purification catalyst according to anyone of [1] to [7] supported on a catalyst support medium.

[9] A method for purifying a gas inside a polymer film production furnace, comprising: a step 1 of bringing hot air containing volatile and/or sublimable organic substances, generated during production of a polymer film by the polymer film production furnace, into contact with the catalyst according to any one of [1] to [8], which is provided inside or outside the furnace, at a temperature in the range of 180 to 350° C. to decompose the organic substances oxidatively; and a step 2 of refluxing all of or a part of a resultant decomposition gas to the polymer film production furnace.

Advantageous Effects of Invention

The catalyst of the present invention has effects as shown below.

(i) Deterioration in the performance is reduced even during long-term use, and the catalyst life is long, as compared with conventional purification catalysts for gases inside polymer film production furnaces.

(ii) Even in an environment where a poisonous substance is coexistent, deterioration in the performance is minimal and catalyst life is long, compared with conventional catalysts. That is, the poisoning resistance is excellent (iii) Effects, such as producibility at a low cost, are exhibited, because an expensive noble metal is not used.

DESCRIPTION OF EMBODIMENTS

Embodiments of the present invention will now be described below.

(Field of Application)

An object to which the catalyst of the present invention is applied is a gas inside a polymer film production furnace, the gas containing volatile organic compounds (VOCs) and sublimable organic substances generated within the polymer film production furnace. The polymer film production furnace refers, for example, to a furnace for stretching a thin plate of a melt-extrudate of starting polymer chips, while heating the thin plate, thereby processing it into a film form.

The type of the polymer is not limited, and includes polymers in general which are formed into films by the above method. Their examples include PET, polyamide (nylon), polyethylene, PVA, polypropylene, polyvinyl chloride, and polystyrene.

(Concrete Description of Present Invention)

Unless otherwise specified herein, the average particle diameter refers to the average particle diameter of secondary particles measured by the laser method. The specific surface area is a value measured by the BET method.

<Composition of Catalyst, Etc.>

The catalyst of the present invention contains a mixed oxide composed of a manganese-based oxide, which contains manganese and potassium and has a cryptomelane structure, and copper oxide.

The cryptomelane structure is considered to be represented by a chemical formula $KMn_8O_{16}$. Concretely, this structure is as follows: Manganese oxide ($MnO_6$) having an octahedral structure containing Mn at the center forms a tunnel-shaped structure. A cross-section of the tunnel-shaped structure is in a nearly quadrilateral shape having two Mn's arranged in one side. That is, an eight-membered ring comprising Mn is provided. A side surface of the tunnel-shaped structure is shared with another adjacent tunnel-shaped structure. Within the tunnel-shaped structure, potassium is arranged so as to fulfill the above-mentioned chemical formula.

Figure 1:
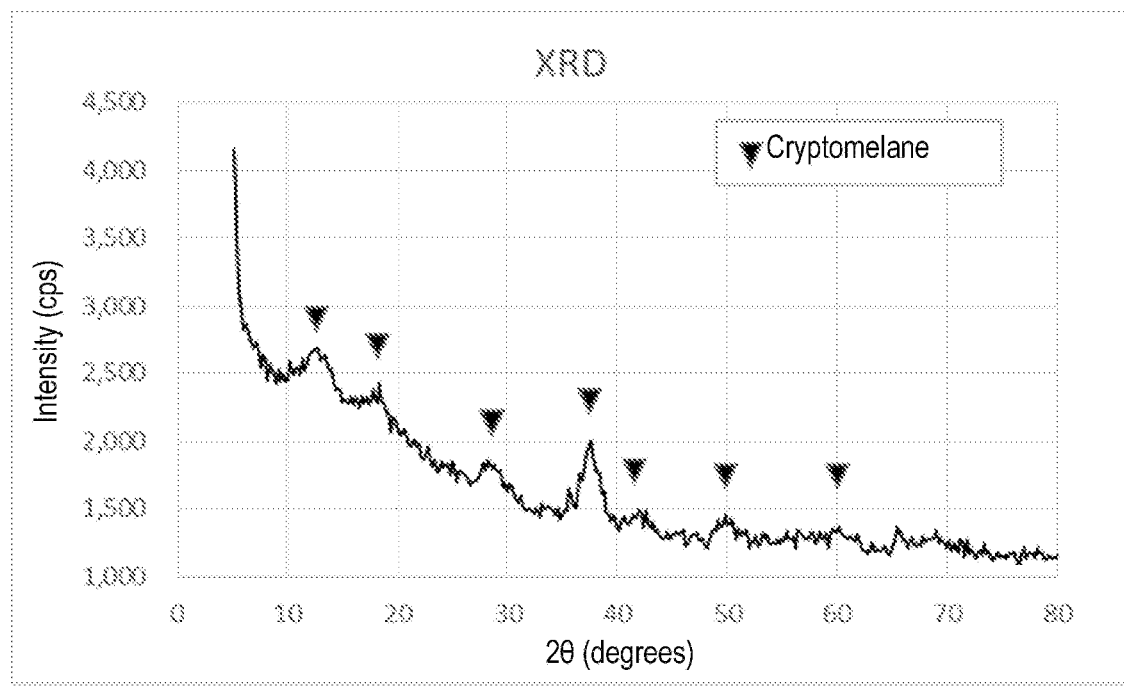
FIG. 1 is an X-ray diffraction pattern showing the crystal structure of a manganese-based oxide having a cryptomelane structure according to the present invention.

Whether the cryptomelane structure is taken or not can be determined by X-ray diffraction (XRD). The results of XRD of the Mn-based composite oxide used in the present invention are as shown in FIG. 1, which reveals that this oxide has the cryptomelane structure.

The mixed oxide of the present invention is a physical mixture of the Mn-based oxide having the cryptomelane structure, and copper oxide.

The content of the copper oxide is preferably 10 to 30% by weight, more preferably 15 to 25% by weight, as CuO based on the mixed oxide. If the content is in the range of 10 to 30% by weight, the purification performance and the durability are enhanced. The content of Cu can be found by XRF (fluorescent X-ray analysis).

The content of Mn is preferably 65 to 85% by weight, more preferably 70 to 80% by weight, as $MnO_2$ based on the mixed oxide. If the content is in the range of 65 to 85% by weight, the purification performance and the durability are enhanced. The content of Mn can be found by XRF (fluorescent X-ray analysis).

The content of potassium is preferably 0.1 to 10% by weight, more preferably 0.5 to 5% by weight, based on the mixed oxide. If the content is in the range of 0.1 to 10% by weight, the purification performance and the durability are enhanced. The content of K can be found by XRF (fluorescent X-ray analysis).

In order to ensure the adsorption of the components to be treated and improve the contact efficiency by an increase in the area of gas contact, the average particle diameter of the mixed oxide is preferably 0.1 to 500 μm, more preferably 0.5 to 200 μm. As the average particle diameter, a value measured by laser diffraction scattering is used.

For the purposes of ensuring the adsorption of the components to be treated, and improving the contact efficiency by increasing the gas contact area, the mixed oxide used has a specific surface area (BET specific surface area, before heat treatment) of preferably 200 $m^2$/g or larger, more preferably 220 $m^2$/g or larger. Further, the specific surface area after heating for 1 hour at 500° C. is preferably 85 $m^2$/g or larger, more preferably 90 $m^2$/g or larger. That is, the mixed oxide undergoing a smaller structural change when heated at a high temperature is preferred. If the specific surface area (before heat treatment) is less than 200 $m^2$/g, the initial purification performance is not sufficient. If the specific surface area after heating for 1 hour at 500° C. is less than 85 $m^2$/g, the durability is poor.

The catalyst of the present invention can be supported on a support medium as will be described later. To enhance adhesion between the catalyst of the present invention and the support medium, a binder can be used. The binder is not particularly limited, and a publicly known binder can be used. Examples of the binder usable are colloidal silica, alumina sol, titania sol, silica sol, boehmite, and zirconia sol.

The catalyst of the present invention does not exclude the incorporation of other components, if they do not impede the intended operational advantages. Examples of the other components include noble metals such as Pt, Pd and Rh.

<Method of Preparing Catalyst>

In applying the catalyst of the present invention to the purification of a gas inside a polymer film production furnace, this catalyst can be used in a form in which it is supported on a support medium (carrier for supporting the catalyst). The preferred support medium is of a form having heat resistance, a high contact efficiency, and a small pressure loss. It is concretely exemplified by a honeycomb, a sheet, a mesh, a pipe, a filter, a perforated metal, and a foam metal. The material for the support medium is not particularly limited, but is preferably the one having heat resistance and corrosion resistance. Its examples include cordierite, alumina, silica, silica alumina, carbon fibers, metal fibers, glass fibers, ceramic fibers, stainless steel, and titanium.

The amount of the catalyst supported on the support medium, if the support medium is a honeycomb, for example, is preferably 100 to 250 g/L, more preferably 140 to 200 g/L, per liter of the honeycomb. If the amount supported is less than 100 g/L, the performance is poor in terms of durability. A larger amount supported results in better durability, but from the viewpoint of productivity, the preferred amount supported is 250 g/L or less.

An example of the concrete method for preparation is as follows: A first step is a step of preparing a slurry containing the mixed oxide and a binder component. A subsequent second step is a step of coating a honeycomb with a predetermined amount of the slurry, and then drying the coated honeycomb at 100 to 200° C. to form a catalyst precursor containing the mixed oxide and the binder component. A succeeding third step is a step of calcining the catalyst precursor in air at a temperature in the range of 200 to 500° C.

<Method for Purification of Polymer Film Production Furnace>

The catalyst of the present invention is disposed within a polymer film production furnace or a hot air circulation system, where it is brought into contact with hot air. The hot air circulation system is a flow path on which hot air generated within the polymer film production furnace is once delivered out of the production furnace, and then returned again into the production furnace. By this procedure, volatile and/or sublimable organic substances included within the production furnace or within the hot air circulation system are decomposed by the catalyst and converted into $CO_2$ and $H_2O$. As a result, the gas inside the furnace is purified. To exhibit the decomposition activity of the catalyst of the present invention, a temperature range of 180 to 350° C., preferably 200 to 350° C., more preferably 210 to 350° C., is preferred. At a temperature of lower than 180° C., the decomposition reaction of the volatile and/or sublimable organic substances does not proceed sufficiently, with the result that the undecomposed volatile and/or sublimable organic substances remain, or carbon monoxide (CO) tends to form. At a temperature exceeding 350° C., on the other hand, the reaction proceeds sufficiently. During the circulation of the treated gas for reuse, however, cooling is required until the temperature lowers to a temperature suitable for heat treatment of the resulting polymer film (i.e., normally 200 to 230° C.), thereby wasting energy. There is no limitation on the space velocity (SV) of the gas. To burn the volatile and/or sublimable organic substances in hot air completely, however, the usual SV is preferably 1,000 to 200,000 $hr^{-1}$, more preferably 2,000 to 100,000 $hr^{-1}$, depending on the concentration of the volatile and/or sublimable organic substances in question. The gas treated with the catalyst (treated gas) is refluxed to the polymer film production furnace, if required. On this occasion, the total amount of the treated gas may be refluxed, or after a part of the treated gas is discharged and fresh air is introduced into the remaining gas, the resulting mixture may be refluxed.

<Actions>

Actions by which the catalyst of the present invention exhibits the effects of decomposing organic fine particles of volatile organic compounds (VOCs) and sublimable organic substances generated within a polymer film production furnace and sustaining its activity have not yet been elucidated, but a synergistic effect attributed to all or some of reactions indicated below is presumed to be obtained. It is to be noted that other reaction mechanisms are not denied. That is, the following reactions are presumed to occur synergistically: (i) A catalytic decomposition reaction (gasification reaction) for converting organic fine particles, which are a polymeric material, into a low molecular weight hydrocarbon, (ii) an oxidation reaction of the resulting low molecular weight hydrocarbon, and (iii) a combustion reaction of coke forming on the catalyst in association with the catalytic decomposition reaction.

<Polymer Film Production Furnace Targeted>

The polymer film production furnace targeted by the present invention refers to a furnace for stretching a thin plate, which is a melt-extrudate of starting polymer chips, while heating the thin plate, thereby processing it into a film form. The type of the polymer is not limited, and includes polymers in general which are formed into films by the above method.

Examples of the polymer include PET, polyamide (nylon), polyethylene. PVA, polypropylene, polyvinyl chloride, and polystyrene.

The present invention will be described in further detail based on the following Examples, but is in no way limited thereto.

EXAMPLES

<Preparation of Catalyst>
(Catalyst 1)

KCG-4P (manufactured by Clariant: a mixed oxide containing a manganese-based oxide, which contains manganese and potassium and has a cryptomelane structure, and copper oxide, according to the present invention; its composition contains 73.0 to 79.0% by weight as $MnO_2$, 20.0 to 24.0% by weight as CuO, and 1.0 to 3.0% by weight as K, based on the mixed oxide) (111.2 g), 117.0 g of SNOWTEX-C(Nissan Chemical Industries, Ltd.), and 71.8 g of deionized water were mixed to prepare a slurry. This slurry was coated on a ceramic corrugated honeycomb (manufactured by Seibu Giken Co., Ltd., 200 cells/square inch) by washcoating, and the excess slurry was blown off by compressed air. Then, the coated honeycomb was dried for 3 hours at 150° C. in a dryer. Then, the dried honeycomb was calcined for 1 hour at 250° C. in air to obtain Catalyst 1 of a honeycomb type supporting a catalyst layer of the mixed oxide. The weight of the catalyst layer per liter of the honeycomb was 157 g.

(Catalyst 2)

114.0 g of KCG-4P (manufactured by Clariant), 120.0 g of SNOWTEX-C (manufactured by Nissan Chemical Industries, Ltd.), and 66.0 g of deionized water were mixed to prepare a slurry. This slurry was coated on a ceramic corrugated honeycomb (manufactured by Seibu Giken Co., Ltd., 200 cells/square inch) by washcoating, and the excess slurry was blown off by compressed air. Then, the coated honeycomb was dried for 3 hours at 150° C. in a dryer. Then, the dried honeycomb was calcined for 1 hour at 250° C. in air to obtain Catalyst 2 of a honeycomb type supporting a catalyst layer of the mixed oxide. The weight of the catalyst layer per liter of the honeycomb was 216 g.

(Catalyst 3)

Catalyst 3 of a honeycomb type supporting a catalyst layer of the mixed oxide according to the present invention was obtained by the same method as for Catalyst 1, except that a cordierite honeycomb (manufactured by NGK INSULATORS, LTD., 200 cells/square inch) was used as a base material. The weight of the catalyst layer per liter of the honeycomb was 148 g.

(Comparative Catalyst 1) (Pt1.8/$Al_2O_3$)

120 g of γ-alumina powder (manufactured by Nikki-Universal Co., Ltd., average particle diameter 5 μm) as solids and 78.0 g of alumina sol as a binder in solid form were mixed with 600 g of deionized water to prepare a slurry. This slurry was coated on a cordierite honeycomb (produced by NGK INSULATORS, LTD., 200 cells/square inch) by washcoating, and the excess slurry was blown off by compressed air. Then, the coated honeycomb was dried for 3 hours at 150° C. in a dryer, and then calcined for 1 hour at 500° C. The weight of the γ-alumina layer per liter of the honeycomb was 40 g. Then, the calcined honeycomb was impregnated with an aqueous solution of dinitrodiamine platinum (manufactured by Tanaka Kikinzoku Kogyo) so that the total Pt content would be 1.8 g/L (per liter of the catalyst support medium). Then, the impregnated honeycomb was dried for 3 hours at 150° C., and then reduced for 1 hour in a hydrogen atmosphere at 500° C. As a result, Comparative Catalyst 1 of a honeycomb type having 1.8 g/L of Pt supported on alumina was obtained. Comparative Catalyst 1 is a catalyst which has been widely used in catalytic applications to purification of the interior of furnaces.

(Comparative Catalyst 2)

Activated manganese dioxide (manufactured by Japan Metals & Chemicals Co., Ltd., BET specific surface area 150 $m^2$/g) was used as a Mn-based oxide. This Mn-based oxide does not have a cryptomelane structure, and is substantially free from potassium (even if potassium is contained, it is in a trace amount corresponding to an impurity level). Nor does the Mn-based oxide contain copper oxide. 99.6 g of the Mn-based oxide, 117.0 g of SNOWTEX-C (manufactured by Nissan Chemical Industries, Ltd.), and 83.4 g of deionized water were mixed to prepare a slurry. This slurry was coated on a ceramic corrugated honeycomb (manufactured by Seibu Giken Co., Ltd., 200 cells/square inch) by washcoating, and the excess slurry was blown off by compressed air. Then, the coated honeycomb was dried for 3 hours at 150° C. in a dryer. Men, the dried honeycomb was calcined for 1 hour at 250° C. in air to obtain Comparative Catalyst 2 of a honeycomb type supporting a catalyst layer of the Mn-based oxide. The weight of the catalyst layer per liter of the honeycomb was 134 g.

(Comparative Catalyst 3)

NJ-300 (manufactured by Japan Metals & Chemicals Co., Ltd.) was used as Mn oxide having a cryptomelane structure, but containing no CuO. 82.0 g of this Mn oxide, 90.0 g of SNOWTEX-C (manufactured by Nissan Chemical Industries, Ltd.), and 128.0 g of deionized water were mixed to prepare a slurry. This slurry was coated on a ceramic corrugated honeycomb (manufactured by Seibu Giken Co., Ltd., 200 cells/square inch) by washcoating, and the excess slurry was blown off by compressed air. Then, the coated honeycomb was dried for 3 hours at 150° C. in a dryer. Then, the dried honeycomb was calcined for 1 hour at 250° C. in air to obtain Comparative Catalyst 3 of a honeycomb type supporting a catalyst layer of the Mn-based oxide. The weight of the catalyst layer per liter of the honeycomb was 179 g.

(Comparative Catalyst 4)

N-840 (manufactured by Clariant) was used as a mixed oxide containing copper oxide and a Mn-based oxide in which the Mn-based oxide contained potassium, but had no cryptomelane structure. 76.4 g of the mixed oxide, 84.0 g of SNOWTEX-C (manufactured by Nissan Chemical Industries, Ltd.), and 120.0 g of deionized water were mixed to prepare a slurry. This slurry was coated on a ceramic corrugated honeycomb (manufactured by Seibu Giken Co., Ltd., 200 cells/square inch) by washcoating, and the excess slurry was blown off by compressed air. Then, the coated honeycomb was dried for 3 hours at 150° C. in a dryer. Then, the dried honeycomb was calcined for 1 hour at 250° C. in air to obtain Comparative Catalyst 4 of a honeycomb type supporting a catalyst layer of the Mn-based oxide. The weight of the catalyst layer per liter of the honeycomb was 157 g.

(Comparative Catalyst 5)

DAIPYROXIDE #7710 (manufactured by Dainichiseika Color & Chemicals Mfg. Co., Ltd.) was used as a composite oxide containing copper oxide and a Mn-based oxide in which potassium other than impurities was not contained and the Mn-based oxide had no cryptomelane structure. 80.2 g of the composite oxide, 88.2 g of SNOWTEX-C (manufactured by Nissan Chemical Industries, Ltd.), and 126.0 g of deionized water were mixed to prepare a slurry. This slurry was coated on a ceramic corrugated honeycomb (manufactured by Seibu Giken Co., Ltd., 200 cells/square inch) by washcoating, and the excess slurry was blown off by compressed air. Then, the coated honeycomb was dried for 3 hours at 150° C. in a dryer. Then, the dried honeycomb was calcined for 1 hour at 250° C. in air to obtain Comparative Catalyst 5 of a honeycomb type supporting a catalyst layer of the Mn-based oxide. The weight of the catalyst layer per liter of the honeycomb was 141 g.

<Evaluation of Catalyst Performance>

(i) Evaluation of Caprolactam Decomposition Performance

Reactor

Figure 2:
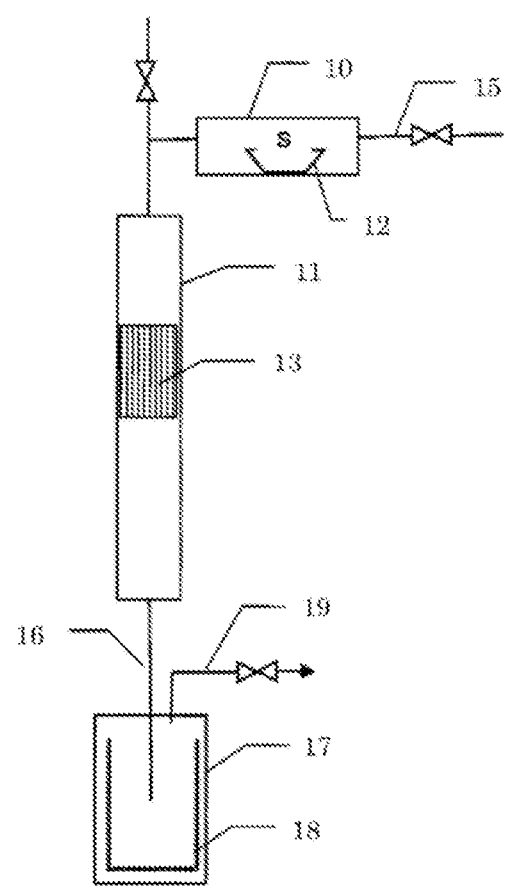
FIG. 2 shows a reactor for evaluation of caprolactam decomposing properties.

Using a flow reactor shown in FIG. 2, ε-caprolactam decomposition tests of Catalysts 1 and 2 and Comparative Catalysts 1 to 5 were conducted. ε-caprolactam is a typical substance which is deposited and accumulated within a polyamide film production furnace, and the removal of this substance is desired. Within a sample evaporation container 10 of the reactor, a sample container 12 for holding a powder of ε-caprolactam (indicated by S in the drawing) is disposed. A catalyst 13 (cylindrical honeycomb catalyst; diameter 21 mm, length 50 mm) is installed in a reaction tube 11. A gas treated with the catalyst (i.e., an exhaust gas) is accommodated in a gas collection container 17 connected to the reaction tube 11 via connection piping 16, and is cooled there to 0 to 5° C. from outside. The undecomposed ε-caprolactam is recovered in a solid form into a sampling container 18 installed within the container 17, and is weighed. At the same time, an exhaust pipe 19 connected to the gas collection container 17 continuously measures the concentration of $CO_2$ in the exhaust gas. The $CO_2$ concentration was measured with Model 410i manufactured by Thermo Fisher Scientific.

Operation

With a mixed gas composed of an $N_2$ gas and an $O_2$ gas (volume ratio 80:20) being flowed through a gas introduction pipe 15 of the reactor, the reaction tube 11 is heated from outside so that the catalyst 13 reaches 210° C. The mixed gas has a flow rate set so that its space velocity becomes 70,000 $h^{-1}$. The sample evaporation container 10 is heated and held at 170° C. At the start of the test, a sample inlet attached to the sample evaporation container is opened, the sample container 12 holding 0.4 g of ε-caprolactam (manufactured by Wako Pure Chemical Industries, Ltd.) is placed within the sample evaporation container 10, and then the sample inlet is closed promptly. As a result, the ε-caprolactam is melted and volatilized. The volatilized ε-caprolactam is transported to the catalyst 13, which has been heated at 210° C., by the mixed gas introduced through the gas introduction pipe 15, and is treated with the catalyst 13. One test lasts for 60 minutes from the charging of the ε-caprolactam. During the 60-minute test, the $CO_2$ concentration in the exhaust gas is continuously measured. After a lapse of 60 minutes, the sample container 12 is taken out of the sample evaporation container 10, and the amount of ε-caprolactam after the test is weighed. From the weighed amount, the amount of the volatilized ε-caprolactam is calculated.

$CO_2$ Formation Rate

Based on the $CO_2$ concentration continuously measured, the amount of $CO_2$ discharged during one test (i.e., V2(L)) is determined. From the amount of the volatilized ε-caprolactam, moreover, the amount of $CO_2$ provided that all the volatilized ε-caprolactam has been converted into $CO_2$ (i.e., V1(L)) is calculated. Based on these amounts, the $CO_2$ formation rate is calculated from the equation indicated below. The fact that this value is high means that a proportion in which ε-caprolactam has been completely oxidized is high, that is, that the catalyst performance is high.

$$CO_2 \text{ formation rate } (\%) = V2/V1 \times 100$$

ε-caprolactam Removal Rate

After the above-described test is conducted 3 times, the sampling container 18 is weighed, and the amount of the undecomposed ε-caprolactam is calculated. Then, the ε-caprolactam removal rate is calculated from the equation shown below. A high value of this rate means that the concentration of ε-caprolactam on the outlet side of the catalyst is low, thus demonstrating that the catalyst performance is high.

$$\text{Removal rate } (\%) = (C1-C2)/C1 \times 100$$

C1: Sum of amounts (g) of ε-caprolactam volatilized in three tests

C2: Amount (g) of undecomposed ε-caprolactam captured in sampling container 18

Results

Figure 3:
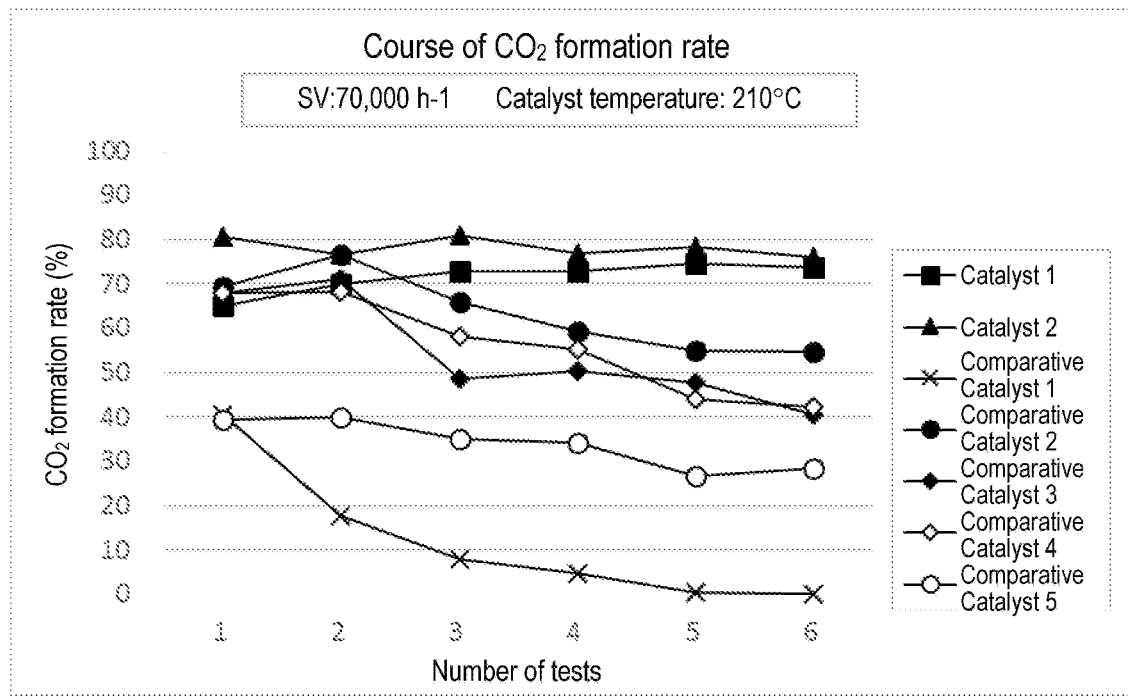
FIG. 3 is a graph showing the course of a $CO_2$ formation rate due to caprolactam decomposition.
Figure 4:
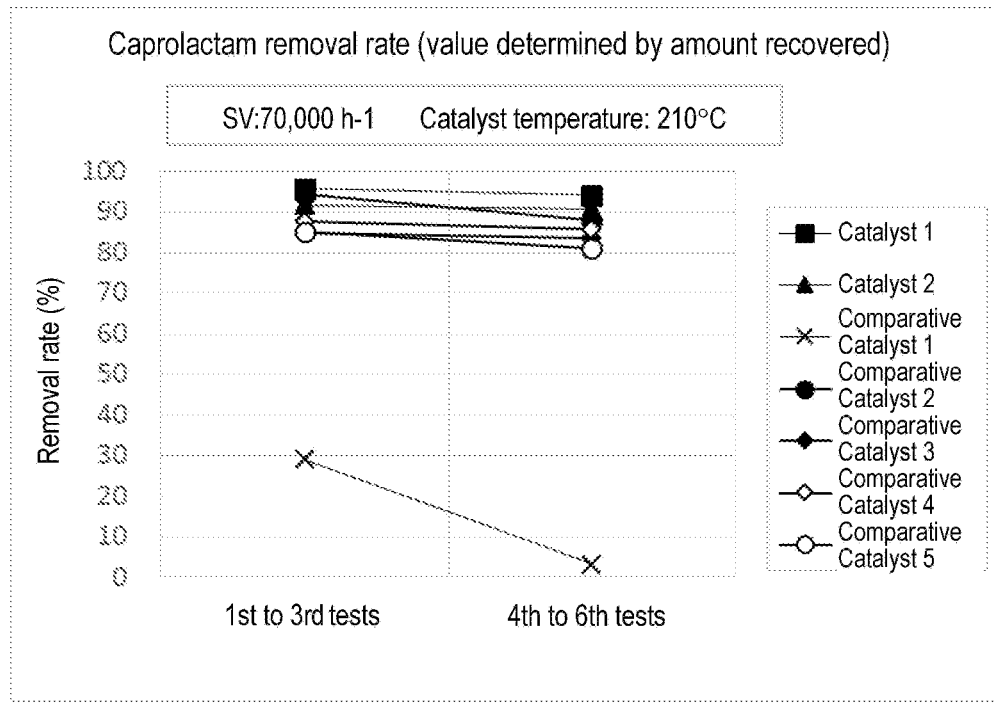
FIG. 4 is a graph showing the removal rate of caprolactam.

As shown in Table 1 and FIG. 3, Catalysts 1 and 2 of the present invention were high in the $CO_2$ formation rate, and decreases in the $CO_2$ formation rate were minimal even after repeated measurements, as compared with Comparative Catalysts 1 to 5. In connection with the caprolactam removal rate as well, Catalysts 1 and 2 of the present invention were superior to Comparative Catalysts 1 to 5, as shown in Table 2 and FIG. 4. These findings demonstrate that Catalysts 1 and 2 of the present invention have better caprolactam decomposition performance than the comparative catalysts.

TABLE 1

| | $CO_2$ formation rate | | | | | |
|---|---|---|---|---|---|---|
| Sample | 1st test (%) | 2nd test (%) | 3rd test (%) | 4th test (%) | 5th test (%) | 6th test (%) |
| Catalyst 1 | 65.2 | 70.0 | 72.8 | 72.8 | 74.7 | 73.6 |
| Catalyst 2 | 80.5 | 76.6 | 81.1 | 77.0 | 78.5 | 76.0 |
| Comparative Catalyst 1 | 40.5 | 17.8 | 7.8 | 4.6 | 0.3 | 0.0 |
| Comparative Catalyst 2 | 69.5 | 76.6 | 66.1 | 59.4 | 55.1 | 54.8 |
| Comparative Catalyst 3 | 67.9 | 71.3 | 48.5 | 50.2 | 47.7 | 40.6 |
| Comparative Catalyst 4 | 68.0 | 68.3 | 58.1 | 55.4 | 44.1 | 42.2 |
| Comparative Catalyst 5 | 39.5 | 39.9 | 35.1 | 34.2 | 26.8 | 28.4 |

TABLE 2

| Sample | Removal rate | |
| --- | --- | --- |
| | 1st to 3rd tests (%) | 4th to 6th tests (%) |
| Catalyst 1 | 95.6 | 94.2 |
| Catalyst 2 | 91.7 | 90.7 |
| Comparative Catalyst 1 | 29.1 | 3.3 |
| Comparative Catalyst 2 | 94.4 | 88.0 |
| Comparative Catalyst 3 | 84.8 | 83.5 |
| Comparative Catalyst 4 | 87.5 | 85.8 |
| Comparative Catalyst 5 | 85.2 | 81.0 |

(ii) Evaluation of PET Oligomer Decomposition Performance

Reactor

Figure 5:
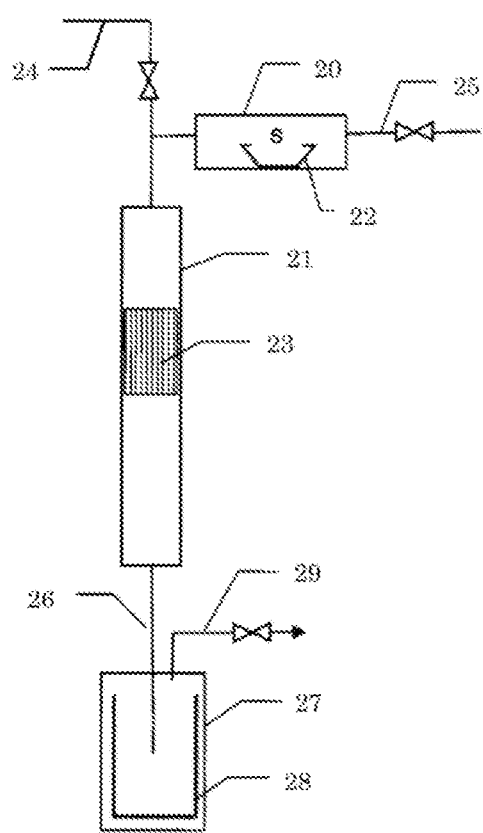
FIG. 5 shows a reactor for evaluation of PET oligomer decomposing properties.

Using a flow reactor shown in FIG. 5, PET oligomer decomposition tests of Catalysts 1 and 3 and Comparative Catalyst 1 were conducted. Within a sample evaporation container 20 of the reactor, a sample container 22 for holding PET chips (indicated by S in the drawing) is disposed. A catalyst 23 (cylindrical honeycomb catalyst; diameter 21 mm, length 50 mm) is installed in a reaction tube 21. To an upstream side of an organosilicon gas introduction pipe 24, an organosilicon bubbling device (not shown) is connected. A downstream side of the organosilicon gas introduction pipe 24 is connected to a downstream side of a gas introduction pipe 25, providing a structure in which an organosilicon gas generated by bubbling can be supplied into the reaction tube 21. The supplied organosilicon gas works as a substance poisonous to the catalyst. KF-96L-1CS manufactured by Shin-Etsu Chemical Co., Ltd. is used as organosilicon, and volatilized by bubbling. The gas treated with the catalyst (i.e., an exhaust gas) is accommodated in a gas collection container 27 connected to the reaction tube 21 via connection piping 26, and is cooled there to 0 to 5° C. from outside. The undecomposed PET oligomer is recovered in a solid form into a sampling container 28 installed within the container 27, and is weighed. At the same time, an exhaust pipe 29 connected to the gas collection container 27 continuously measures the concentration of $CO_2$ in the exhaust gas. The $CO_2$ concentration was measured with Model 410i manufactured by Thermo Fisher Scientific.

Operation

With a mixed gas composed of an $N_2$ gas and an $O_2$ gas (volume ratio 80:20) being flowed through the gas introduction pipe 25 of the reactor, the reaction tube 21 is heated from outside so that the catalyst 23 reaches 230° C. The mixed gas has a flow rate set so that its space velocity becomes 35,000 $h^{-1}$. The sample evaporation container 20 is heated and held at 400° C. At the start of the test, a sample inlet attached to the sample evaporation container is opened, the sample container 22 holding 1.65 g of PET chips is placed in the sample evaporation container 20, and then the sample inlet is closed promptly. As a result, the PET chips are melted to generate a PET oligomer. The generated PET oligomer is transported to the catalyst 23, which has been heated at 230° C., by the mixed gas introduced through the gas introduction pipe 25, and is treated with the catalyst 23. Simultaneously with the transportation of the PET oligomer into the catalyst 23, the organosilicon gas is supplied into the reaction tube 21 via the organosilicon gas introduction pipe 24. Consequently, the decomposition of the PET oligomer is performed under a poisonous environment due to the organosilicon gas. One test lasts for 30 minutes from the charging of the PET chips. During the 30-minute test, the $CO_2$ concentration in the exhaust gas is continuously measured. After a lapse of 30 minutes, the sample container 22 is taken out of the sample evaporation container 20, and the amount of the PET chips after the test is weighed. From the weighed amount, the amount of the volatilized PET chips is calculated.

$CO_2$ Formation Rate

Based on the $CO_2$ concentration continuously measured, the amount of $CO_2$ discharged during one test (i.e., V2(L)) is determined. From the amount of the volatilized PET chips, moreover, the amount of $CO_2$ provided that all the volatilized PET chips are converted into $CO_2$ (i.e., V1(L)) is calculated. Based on these amounts, the $CO_2$ formation rate is calculated from the equation indicated below. A high value of this rate means that a proportion in which the volatilized PET oligomer has been completely oxidized is high, namely, that the catalyst performance is high.

$$CO_2 \text{ formation rate } (\%) = V2/V1 \times 100$$

PET Oligomer Removal Rate

After the above-described test is conducted 6 times, the sampling container 28 is weighed, and the amount of the undecomposed PET oligomer is calculated. Men, the PET oligomer removal rate is calculated from the equation shown below. A high value of this rate means that the concentration of the PET oligomer on the outlet side of the catalyst is low, thus demonstrating that the catalyst performance is high.

$$\text{Removal rate } (\%) = (C1 - C2)/C1 \times 100$$

C1: Sum of amounts (g) of PET chips volatilized in six tests

C2: Amount (g) of undecomposed PET oligomer captured in sampling container 28

Results

Figure 6:
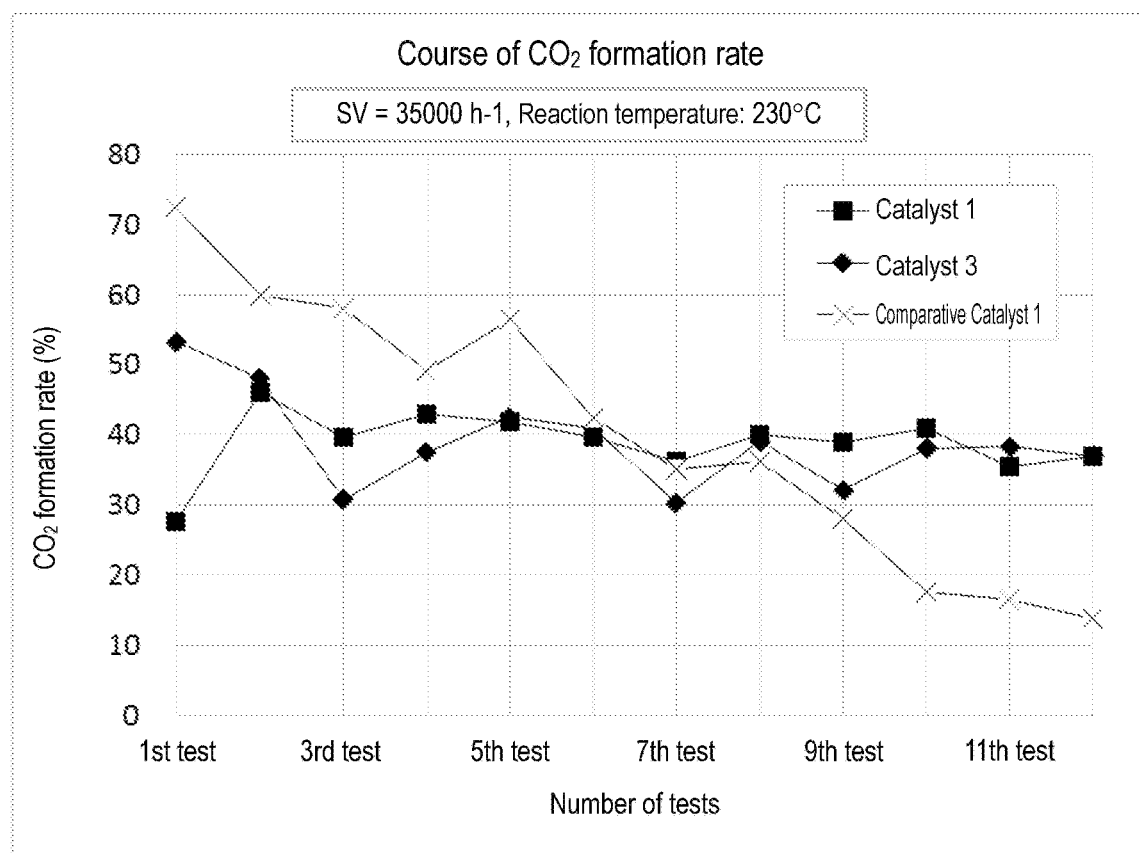
FIG. 6 is a graph showing the course of a $CO_2$ formation rate due to PET oligomer decomposition.
Figure 7:
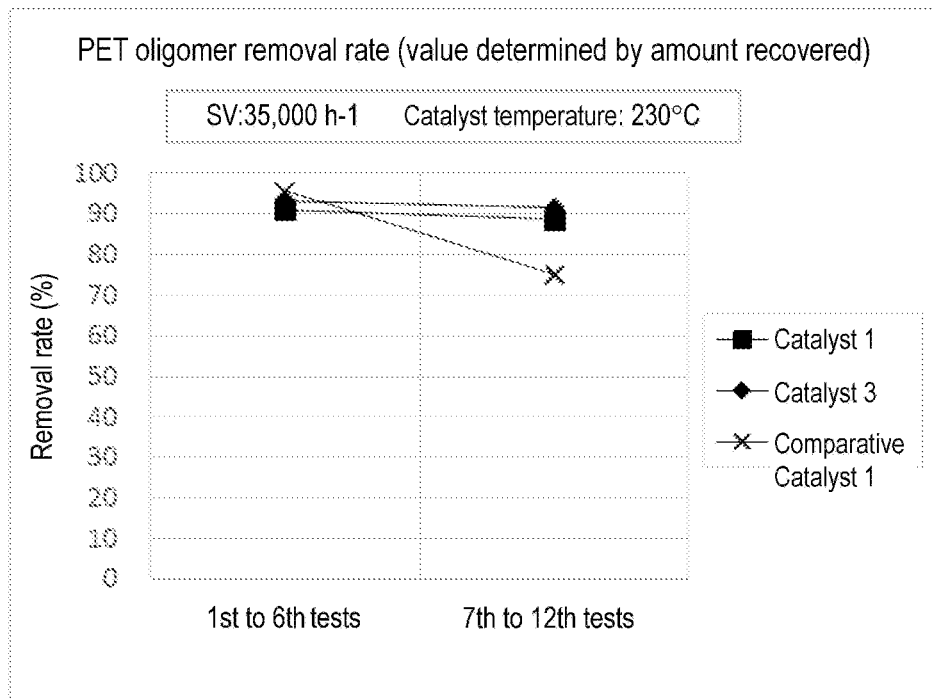
FIG. 7 is a graph showing the removal rate of a PET oligomer.

As shown in Table 3 and FIG. 6, Comparative Catalyst 1 showed a high $CO_2$ formation rate at the initial stage, but this formation rate declined rapidly. This finding shows that Comparative Catalyst 1 is easily poisoned with organosilicon. Catalysts 1 and 3 of the present invention, on the other hand, were lower than the comparative catalyst in the initial $CO_2$ formation rate, but their decreases in the $CO_2$ formation rate were slower. That is, Catalysts 1 and 3 of the present invention were more resistant to poisoning by organosilicon, and were longer in catalyst life. In connection with the PET oligomer removal rate, Catalysts 1 and 3 of the present invention were comparable to Comparative Catalyst 1, as shown in Table 4 and FIG. 7. These findings demonstrate that Catalysts 1 and 3 of the present invention are superior in PET oligomer removal performance to Comparative Catalyst 1.

The measurements made in the present 12 tests correspond to about 1 year of use in a general real furnace (depending on the type of a polymer film manufactured in a production furnace, the manufacturing conditions, and so on, however, the duration of use may be longer or shorter than 1 year).

TABLE 3

| Catalyst No. | CO$_2$ formation rate (%) | | | | | | | | | | | |
|---|---|---|---|---|---|---|---|---|---|---|---|---|
| | 1st test (%) | 2nd test (%) | 3rd test (%) | 4th test (%) | 5th test (%) | 6th test (%) | 7th test (%) | 8th test (%) | 9th test (%) | 10th test (%) | 11th test (%) | 12th test (%) |
| Catalyst 1 | 27.7 | 46.0 | 39.8 | 42.9 | 41.9 | 39.8 | 36.3 | 40.0 | 39.1 | 40.9 | 35.4 | 37.0 |
| Catalyst 3 | 53.3 | 48.1 | 30.8 | 37.5 | 42.6 | 41.0 | 30.3 | 39.2 | 32.2 | 38.1 | 38.4 | 37.0 |
| Comparative Catalyst 1 | 72.5 | 59.9 | 58.1 | 49.3 | 56.5 | 42.4 | 35.1 | 36.2 | 28.1 | 17.6 | 16.5 | 13.8 |

TABLE 4

| | Decomposition rate | |
|---|---|---|
| Test No. | 1st to 6th tests | 7th to 12th tests |
| Catalyst 1 | 91.0 | 88.6 |
| Catalyst 3 | 93.3 | 91.5 |
| Comparative Catalyst 1 | 95.5 | 75.1 |

(iii) Measurement of Specific Surface Area

The various mixed oxides and composite oxides used above were measured for the BET specific surface areas before heat treatment and after heat treatment performed for 1 hour at 500° C. The BET specific surface areas were measured with TriStar II 3020 manufactured by Micromeritics. The results of the measurements are shown in FIG. 8.

Figure 8:
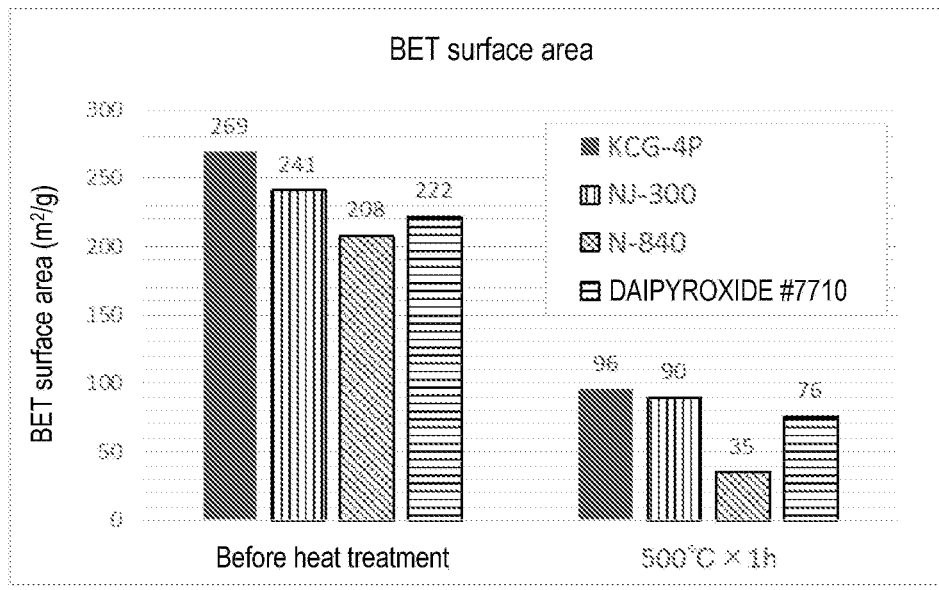
FIG. 8 is a graph showing the BET specific surface areas of mixed oxides or composite oxides used in Examples and Comparative Examples.

As shown in FIG. 8, KCG-4P used in the Example had a specific surface area of more than 85 m$^2$/g even after heat treatment performed for 1 hour at 500° C. N-840 and DAIPYROXIDE #7710, on the other hand, had specific surface areas of more than 200 m$^2$/g before heat treatment, but showed specific surface areas of less than 85 m gafter heat treatment performed for 1 hour at 500° C. That is, KCG-4P proves to be smaller in structural change due to heat treatment than N-840 and DAIPYROXIDE #7710.

REFERENCE SIGNS LIST 10, 20 Sample evaporation container
11, 21 Reaction tube
12, 22 Sample container
13, 23 Catalyst
24 Organosilicon gas introduction pipe
15, 25 Gas introduction pipe
16, 26 Connection piping
17, 27 Gas collection container
18, 28 Sampling container
19, 29 Exhaust pipe

The invention claimed is:

1. A method for purifying a gas inside a polymer film production furnace, comprising:

a step 1 of bringing hot gas containing volatile and/or sublimable organic substances, generated during production of a polymer film by the polymer film production furnace, to flow from the polymer film production furnace to a purification catalyst at a flow rate of a space velocity of 70,000 to 200,000 hr$^{-1}$, so that the hot gas comes into contact with the purification catalyst, which is provided inside or outside the furnace, at a temperature in a range of 180 to 350° C. to decompose the organic substances oxidatively; and a step 2 of refluxing all of or a part of a resultant decomposition gas to the polymer film production furnace, wherein the purification catalyst contains a mixed oxide composed of a manganese-based oxide containing manganese and potassium and having a cryptomelane structure, and copper oxide, wherein a content of the copper oxide is 15% by weight or more as CuO based on the mixed oxide, and wherein a content of the potassium is 0.1 to 10% by weight based on the mixed oxide.

2. The method according to claim 1, wherein a content of the copper oxide is 15 to 30% by weight as CuO based on the mixed oxide.

3. The method according to claim 1 or 2, wherein a content of the manganese is 65 to 85% by weight as MnO$_2$ based on the mixed oxide.

4. The method according to any one of claim 1, wherein a specific surface area (BET specific surface area) of the mixed oxide is 200 m$^2$/g or more.

5. The method according to claim 1, wherein a specific surface area (BET specific surface area) of the mixed oxide after being heated for 1 hour at 500° C. is 85 m$^2$/g or more.

6. The method according to claim 1, wherein the gas inside the polymer film production furnace contains volatile and/or sublimable organic substances generated during production of a polymer film.

7. The method according to claim 1, wherein the purification catalyst is supported on a catalyst support medium.

* * * * *

UNITED STATES PATENT AND TRADEMARK OFFICE
CERTIFICATE OF CORRECTION

| | |
|---|---|
| PATENT NO. | : 11,642,660 B2 |
| APPLICATION NO. | : 16/938539 |
| DATED | : May 9, 2023 |
| INVENTOR(S) | : Toshiya Nashida et al. |

It is certified that error appears in the above-identified patent and that said Letters Patent is hereby corrected as shown below:

On the Title Page

After item (65), please insert:
-- (30) Foreign Application Priority Data
Nov. 5, 2015 (JP) ............................ 2015-217273 --

Signed and Sealed this
Twenty-sixth Day of December, 2023

Katherine Kelly Vidal
*Director of the United States Patent and Trademark Office*